April 19, 1966  E. J. BRAYLEY ETAL  3,247,443
VOLTAGE REGULATOR
Filed Jan. 25, 1963
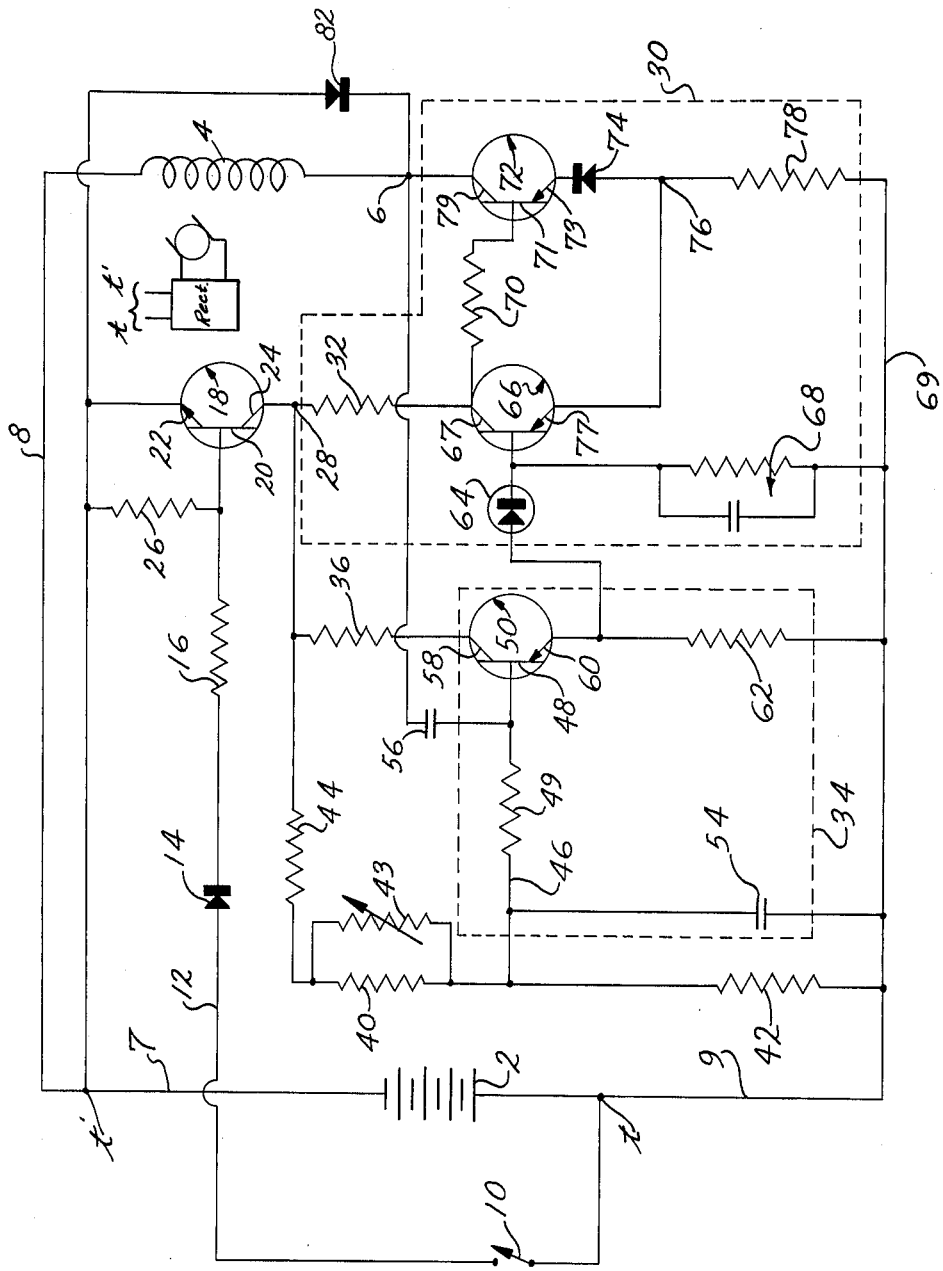
INVENTORS
ELWIN J. BRAYLEY
THOMAS E. SWIFT
BY Chapin + Neal
Attorneys

United States Patent Office 3,247,443
Patented Apr. 19, 1966

3,247,443
VOLTAGE REGULATOR
Elwin J. Brayley, Longmeadow, and Thomas E. Swift, West Springfield, Mass., assignors to Globe-Union Inc., Milwaukee, Wis., a corporation of Delaware
Filed Jan. 25, 1963, Ser. No. 253,961
8 Claims. (Cl. 320—68)

This invention relates to voltage regulators and more particularly to improved transistor voltage regulators for use with battery-alternator power sources for supplying electrical loads including ignition systems through an ignition switch.

The principal object of this invention is to provide an improved transistor voltage regulator which eliminates the problem of ignition switch failure caused by electrical overloading.

Another object of this invention is to provide an improved voltage regulator directly connected to the battery with short low resistance leads thereby eliminating regulation errors caused by substantial voltage drops in the leads interconnecting the ignition switch, battery and the regulator.

Also an object of this invention is to provide a voltage regulator which can be connected to regulate existing battery-alternator power systems without disrupting the existing circuitry.

It is another object of this invention to provide a voltage regulator for battery-alternator systems which eliminates the problems of regulator hunting or unsatisfactory operation caused by ripple voltage developed across the battery.

It is a further object of this invention to provide a voltage regulator having a fast switching time and a low repetition rate for a battery-alternator system which provides for increased transistor life by preventing operation in response to voltage ripples and by minimizing heat losses.

The above and other objects of the invention will be apparent from a reading of the following description and drawing in which is shown a circuit diagram of a voltage regulator embodying this invention.

Referring in detail to the drawing, a voltage regulator embodying the invention is shown electrically connected to control the charging of a battery 2 by an alternator, the field coil of which is represented at 4. The alternator field is connected on one side to a junction 6 of the voltage regulator, and on the other side to the negative terminal of the battery 2 by lead 8. The battery is connected to the regulator terminals by short, heavy leads, represented by lines 7 and 9, and the alternator output, rectified, is connected by terminals $t$ and $t'$ to battery terminals $t$ and $t'$.

Ignition switch 10 together with diode 14, resistor 16, and base-emitter of transistor 18, are connected in series by lead 12 across the battery from its positive to its negative terminals. The transistor 18 is an NPN type junction transistor having a base 20, emitter 22 and collector 24. A base-emitter biasing resistor 26 is across leads 7 and 12. The collector electrode 24 of the transistor 18 is connected to a junction 28, the emitter to the negative battery potential and the base to the dropping resistor 16.

A Schmitt trigger or flip-flop circuit of the transistor type is shown generally at 30 connected to the junction 28 through resistor 32. An electronic filter network, shown generally at 34, is connected to the junction 28 through resistor 36. A voltage divider network, including resistors 40 and 42, voltage adjusting resistor 43 and resistor 44, is connected to junction 28 from the positive battery potential. Transistor 18 may also be considered as part of the divider but its primary function is as a switch to turn the regulator circuit on and off.

From a selected point of the voltage divider, lead 46 is connected through resistor 49 to the base 48 of a transistor 50, which is shown as a PNP type of transistor. The variable resistor 43 is provided across the resistor 40 and may be externally adjustable to bias the transistor 50 to its low impedance condition when the battery voltage reaches a predetermined set value. Capacitor 54 is provided across the resistor 42 and together with the resistor 49 forms a resistance-capacitance filter, to minimize voltage ripple developed across the battery. A capacitor 56 is connected from the base of the transistor 50 to junction 6 providing negative feedback from the trigger circuit as will hereinafter be described.

In addition to base 48, the transistor 50 includes a collector 58 and emitter 60. The collector 58 is connected to resistor 36 while the emitter is connected to the positive side of the battery through resistor 62. The emitter 60 is coupled to the trigger circuit 30 through zener diode 64, in turn connected to the base of PNP type transistor 66. An RC network 68 is connected from the base of the transistor 66 to lead 69 from the positive battery terminal. This network serves as means to hold the transistor 66 in its low impedance state for a predetermined period of time during which transistor 72 is "off." The collector electrode 67 of the transistor 66 is connected by coupling resistor 70 to the base electrode 71 of the transistor 72, also a PNP junction type. The emitter 73 of the transistor 72 is connected through diode 74 to junction 76 common to the emitter 77 of transistor 66.

From junction 76 the trigger circuit is completed through resistor 78 to the positive battery terminal. Resistor 78 is common to the emitter circuits of both transistors 66 and 72 insuring complete shift in conduction from one to the other of transistors 66 and 72 making up the trigger circuit. The collector 79 of transistor 72 is connected to junction 6 common to the field coil 4 and lead 8 which connects to the negative battery terminal; diode 82 is connected in parallel with the coil 4 to suppress high voltage peaks deleteriously affecting the transistors.

In operation, when the ignition switch 10 is closed, electron flow occurs from the negative battery terminal through the emitter 22, base 20 of the transistor 18, dropping resistor 16, diode 14 and the ignition switch 10 to the positive terminal of the battery. The diode serves to protect the regulator circuit from ignition coil spikes caused by opening the ignition switch when a high voltage is impressed across the ignition coil.

As is well known, electron flow in the base-emitter circuit of a transistor is small, and controls emitter-collector current of the transistor. There is thus small current flow in the line 12 and the transistor 18 is forward biased, so that the small electron flow in the base-emitter circuit results in large current flow in the emitter collector circuit. The transistor 18 is thus biased to a low impedance condition, and in effect, the transistor 18 couples the regulator circuit 30 directly to the negative battery terminal since the impedance of the transistor is so low. With the circuit arrangement described, it will be seen that the battery and regulator can be directly connected by power lines 7 and 9 independently of the ignition switch. This is important because in most installations the ignition switch is physically separated from the battery and regulator by a substantial distance. By an arrangement shown, the voltage regulator operation is keyed directly to the battery voltage and is essentially independent of any substantial voltage drop in the ignition switch or lead wires to the switch from the battery and regulator. In addition, only small current flows through the ignition switch thereby minimizing the incidence of switch burnout caused by excessive electrical loading.

When the alternator is driven by an engine, such as an an automobile engine, the alternator output will charge the battery 2. At this time field current is flowing through the coil 4 and through the collector-emitter electrodes of the transistor 72, in series with the coil 4. Conduction of the transistor 72 is controlled by the operation of the transistor 66 which during battery charging is in its high impedance condition. In its low impedance condition transistor 66 operates to shunt current around the base-emitter of transistor 72.

Transistor 66 is connected with its base current controlled by the zener diode 64. The zener prevents current flow in the base-emitter circuit of the transistor 66. There is thus substantially no current flow in the emitted-collector circuit of this transistor until the breakdown voltage of the zener diode is achieved across resistor 62. Operation of the zener diode to its breakdown voltage, with a consequent shift of transistor 66 to its low impedance condition, is controlled by the voltage divider network including resistors 42, 43 and 44 in conjunction with the transistor 50. As stated above, when the transistor 66 becomes conductive the transistor 72 is shifted to its high impedance condition thereby cutting off flow of current through the field coil 4 of the alternator. The alternator output is thus cut off and no longer charges the battery.

During the battery charging cycle, electron flow takes place from the negative battery terminal through the transistor 18, which, as mentioned above, is in its low impedance condition. From junction 28 electron flow is through resistor 32 to the collector 67 of the transistor 66, then through coupling resistor 70 to the base 71 of the transistor 72, from the base to the emitter 73, diode 74 and resistor 78. This base-emitter current results in a large current flow between the emitter and collector of the transistor 72 through resistor 78 and the field coil 4. At this time there is substantially no current flow in the base-emitter circuit of the transistor 66, nor in the base-emitter circuit of the transistor 50 which is also in its high impedance condition.

When the battery voltage rises above the set point of the regulator, voltage across resistor 40 and its voltage adjusting resistor 43 rises to forward bias the base of the transistor 50 whereby increased base-emitter current flows through the transistor 50, resistor 62, resistors 49, 40 and 43, 44 and the transistor 18 to the negative terminal of the battery. It should be noted that the regulator is voltage responsive and thus the power lines need not be disrupted to effect connection of the regulator to an existing battery-alternator system. The emitter-base current through transistor 50 drives the transistor to its low impedance state causing sharp increase in its emitter-collector current which flows from the positive battery terminal through resistor 62, the emitter-collector electrodes of the transistor 50, resistor 36, and transistor 18 to the negative battery terminal. When the voltage across resistor 62 rises to the breakdown point of zener diode 64, current flows through resistor 68. The voltage drop across resistor 68 is seen across the base-emitter of transistor 66 causing current to flow in this junction. This causes transistor 66 to start to change to its low impedance state and transistor 72 to its high impedance state. As transistor 72 turns off, the amount of current through resistor 78 is greatly reduced resulting in a decrease of the voltage drop across resistor 78. The voltage differential seen by the zener diode 64 is thus increased forcing the zener further over its breakdown voltage "knee"; transistor 66 thus saturates turning off transistor 72.

When the transistor 72 is rendered non-conductive there is a rapid voltage drop or decay which occurs across the transistor 72; this pulse is fed back to the transistor 50 by means of capacitor 56. This feedback is in the form of a negative pulse which biases the base of the transistor 50 more negative to further drive the transistor 50 to its low impedance state. The negative feedback also causes an increase in the charge of capacitor 54. In this way the transistor 50 is held in its low impedance condition for sufficient time to allow capacitor 54 to discharge. Increased emitter-collector current of transistor 50 further increases the voltage drop across resistor 62 and in effect pushes the zener diode well beyond its breakdown point. By this circuit arrangement there is thus assurance of complete "cut off" of transistor 72 once zener breakdown voltage has been reached by current flow through transistor 50.

It will be realized that the transistor 50 is connected as a high input impedance, low output impedance tranformer functioning as an electronic filter for the trigger circuit. In this connection, as the battery voltage peaks, bias of the transistor is increased. This results in increased current flow through resistor 62, which as described above, causes operation of the trigger circuit. Ripple voltages, however, are not of sufficient duration to swing the transistor 50 to its low impedance state.

When the transistor 72 is "cut off," as described above, the alterator is no longer generating an output and as a result the battery voltage will drop below the set point voltage of the zener diode. The zener will return to its high impedance condition, and in effect open the base-emitter circuit of transistor 66. As a result the collector-emitter current is reduced so that the transistor becomes substantially non-conductive. Electron flow through transistor 18 reverts to its former path through resistor 70 and the base emitter electrodes of the transistor 72. This electron flow again biases the transistor to its low impedance condition whereby full field current flows from the positive terminal of the battery through resistor 78, diode 74, the emitter-collector electrodes of the transistor 72 and the field winding of the alternator.

In summary, the voltage regulator embodying this invention includes an electronic control circuit which includes an active electronic filter to which the operation of a trigger circuit is responsive and in addition includes a switching arrangement which results in greater regulator accuracy and longer ignition switch life. Without a filter circuit, of the type described, an alternator having a high degree of ripple such as encountered in certain brushless induction type alternators, the ripple output of the alternator causes the regulator to switch or "hunt" at the frequency of the ripple. Such rapid switching also reduces the life of the transistors, causes excessive heating, and poor regulation.

Utilization of a transistor as a means for interconnecting the ignition switch allows the regulator to be connected directly to the battery with short low resistance leads and provides more efficient regulation. In this manner, the regulator operation is not affected by the voltage drop in the ignition switch circuit. Moreover, only the bias current of the transistor 18 flows through the ignition switch. This is approximately 60 milliamps as compared with approximately 2 to 10 amps in conventional regulators. Such low current in the ignition switch circuit serves to lengthen the switch life by substantially eliminating the problem of ignition switch burn out.

In addition, this regulator can be connected across the battery terminals without breaking into the alternator-battery circuit. This easy method of connecting the regulator to an existing battery-alternator system is made possible because the regulator is operable or responsive to battery voltage rather than alternator current flow.

Having thus described our invention, what is claimed is:

1. In combination with a transistor voltage regulator for a battery-alternator electrical system having an operating switch, a battery source of potential, and a junction type transistor having base, collector and emitter electrodes, circuit means connecting the battery to the regulator through the collector-emitter electrodes of said transistor, and second circuit means connecting through said switch, said battery to the base of said transistor to bias said transistor to its low impedance mode, said second circuit means including said switch whereby there is essentially no current flow through said operating switch when said transistor is in said low impedance mode.

2. In combination with a transistor voltage regulator for a battery-alternator electrical system, an input circuit as set forth in claim 1 and further including an electronic filter network including a second junction type transistor with base, emitter and collector electrodes, the emitter and collector electrodes of said second transistor being connected in series with the emitter-collector electrodes of the first transistor, a voltage divider network for controlling operation of said second transistor, including the emitter-collector electrodes of said first transistor being connected across said battery terminals, and means interconnecting the base of said second transistor and said voltage divider, for controlling operation of said second transistor, the collector-emitter current through said second transistor serving to control the operation of said regulator.

3. In combination with a transistor voltage regulator for a battery-alternator electrical system, an input circuit as set forth in claim 2 in which said regulator includes a pair of junction type transistors connected as a flip-flop circuit, said regulator further including a zener diode interconnected between one of said regulator transistors and said filter network operation of said flip-flop circuit being responsive to voltage breakdown of said zener diode.

4. In combination with a transistor voltage regulator for a battery-alternator electrical system, an input circuit as set forth in claim 3 and in which said zener diode is in the base-emitter circuit of one of the transistors in said regulator, the emitter circuit of both transistors in the regulator being in series with a common emitter resistor.

5. In a transistor voltage regulator for a battery-alternator electrical system having an operating switch, the combination comprising a battery source of potential, a first junction type transistor having base, emitter and collector electrodes, circuit means connecting the collector and emitter electrodes in series with said battery and regulator second circuit means connecting in series one potential side of said battery, said switch and the base of said transistor, and a filter circuit including at least one junction type transistor interconnected with the battery and said first transistor, and means interconnecting said filter circuit and regulator for controlling the operation of said regulator.

6. Circuit controlling operation of a voltage regulator; including a battery, alternator, and solid state the regulator which includes transistors connected in cascade for flip-flop operation and a zener diode for triggering said flip-flop circuit, said circuit comprising a voltage divider network including a junction type transistor having base, emitter and collector electrodes, the emitter-collector junction being connected across said battery, means connecting said zener diode to the emitter of said transistor, means in series with said battery, said emitter and collector electrodes for varying the current flow in said emitter-collector junction to bias said zener diode to its breakdown voltage.

7. Voltage regulator for a battery-alternator electrical system having an ignition switch controlling the operation thereof, said battery serving as a potential source, said regulator comprising a first junction type transistor, with its base-emitter electrodes in series with said ignition switch, a voltage divider network in series circuit with the collector-emitter electrodes of said transistor circuit means connecting in series one potential side of said battery, said switch and the base of said transistor, a filter circuit responsive to the voltage developed across said voltage divider network and including a junction type transistor, and a trigger circuit including a zener diode and two additional junction type transistors, one of the transistors in said trigger circuit having its collector and emitter electrodes connectible in series with the field coil of an alternator, and being biased to its conductive state when the battery voltage is below a predetermined voltage, the second junction type transistor in said trigger circuit being biased to its non-conductive state below said predetermined voltage, and a zener diode connected to the base of said second transistor for rendering said second transistor conductive when the battery voltage exceeds the breakdown voltage of said zener diode, said zener diode being responsive to operation of the transistor in said filter network.

8. In combination with a transistor voltage regulator for a battery-alternator electrical system having a operating switch, a battery serving as a source of potential, an input circuit comprising a junction type transistor having base, collector and emitter electrodes, circuit means interconnecting in series the battery and the base of said transistor, said operating switch being in said circuit, and other circuit means interconnecting in series the collector-emitter electrodes from the battery to said regulator, whereby the wires interconnecting said battery and regulator are independent of said switch, and a diode in series with said switch and base electrode of said transistor to protect the transistor and regulator from excessive voltages caused by switch operation.

References Cited by the Examiner

UNITED STATES PATENTS

| 2,862,175 | 11/1958 | Guyton et al. | 322—73 |
| 2,896,149 | 7/1959 | Lowry et al. | 322—100 |
| 3,022,455 | 2/1962 | Hetzler | 322—100 |
| 3,056,913 | 10/1962 | Henderson et al. | 322—28 |
| 3,176,210 | 3/1965 | Bethke | 320—40 |

LLOYD McCOLLUM, *Primary Examiner.*

S. WEINBERG, *Assistant Examiner.*